United States Patent
Gaspar et al.

(10) Patent No.: US 11,168,732 B2
(45) Date of Patent: Nov. 9, 2021

(54) BOLT RETAINER CLIP

(71) Applicant: The Pullman Company, Milan, OH (US)

(72) Inventors: Zoren E. Gaspar, Huron, OH (US); Joseph F. Cerri, III, Norwalk, OH (US)

(73) Assignee: The Pullman Company, Milan, OH (US)

( * ) Notice: Subject to any disclaimer, the term of this patent is extended or adjusted under 35 U.S.C. 154(b) by 151 days.

(21) Appl. No.: 16/571,530

(22) Filed: Sep. 16, 2019

(65) Prior Publication Data
US 2021/0078641 A1 Mar. 18, 2021

(51) Int. Cl.
*F16B 41/00* (2006.01)
*B62D 27/02* (2006.01)

(52) U.S. Cl.
CPC ............ *F16B 41/002* (2013.01); *B62D 27/02* (2013.01)

(58) Field of Classification Search
CPC ....... B16B 41/002; B16B 41/00; B62D 27/04; B62D 27/06; B62D 27/02
USPC .......................... 296/35.1; 411/999, 517, 521
See application file for complete search history.

(56) References Cited

U.S. PATENT DOCUMENTS

| | | | |
|---|---|---|---|
| 3,709,087 A | 1/1973 | Stone, Jr. | |
| 7,207,762 B2 * | 4/2007 | Teal | F16B 37/065 16/2.1 |
| 7,374,495 B2 * | 5/2008 | Ball | F16B 39/32 470/19 |
| 7,641,429 B2 | 1/2010 | DiStasio et al. | |
| 9,267,532 B2 | 2/2016 | Siegal | |
| 2019/0003517 A1 | 1/2019 | Hess | |

FOREIGN PATENT DOCUMENTS

CN 107269665 A 10/2017

OTHER PUBLICATIONS

Bolt Retainer Clip believed to be publically available on or about Oct. 17, 2018.
Vibracoustic Retainer information believed to be publically available on or about Oct. 17, 2018.
Hydraulic Body Mount Assembly Process believed to be publically available on or about Oct. 17, 2018.

\* cited by examiner

*Primary Examiner* — Dennis H Pedder
(74) *Attorney, Agent, or Firm* — Harness, Dickey & Pierce, P.L.C.

(57) ABSTRACT

A bolt retainer clip for positioning a fastener and maintaining its alignment within a vehicle body mount. The bolt retainer clip includes a retainer body that has a longitudinal axis, an inside surface, and an outside surface. The inside surface defines a bolt receiving aperture in the retainer body. A plurality of fingers extend into the bolt receiving aperture from the inside surface of the retainer body. A portion of each finger is curved, creating a line contact between the fastener and each finger at a location that is spaced from a terminal end of the finger. Each line contact runs parallel to the longitudinal axis and therefore limits gimbaling movements of the fastener relative to the retainer body.

10 Claims, 6 Drawing Sheets

BOLT RETAINER CLIP

FIELD

The present disclosure relates to vehicle body mounts, subframe mounts, engine mounts and other vehicle mounting systems. More particularly, the present disclosure relates to a bolt retainer clip used for retaining a bolt in co-axial alignment within a bore in a vehicle body mount subassembly before the vehicle body is dropped on a frame.

BACKGROUND

This section provides background information related to the present disclosure which is not necessarily prior art.

Fluid filled, vibration damping mounts are utilized for vehicle body mounts, subframe mounts, and engine mounts. These damping mounts are used to couple two vehicle components together while damping the vibrations between the components. Often times, such mounts are pre-assembled and are installed on one of the vehicle components before the two vehicle components are brought together and connected. For example, vehicle body mounts are typically mounted to a vehicle frame as a pre-assembled subassembly. After the vehicle body mount is attached to the frame, a bolt or other fastener is inserted into the vehicle body mount, typically from the bottom up. Later on during the vehicle assembly process (e.g., further down the assembly line), a vehicle body is dropped on the frame and the bolt is threaded into a threaded receptacle, bracket, or nut to couple (i.e., marry/join) the vehicle body and the frame.

When this vehicle assembly process is utilized, there is a need to retain the bolt in the vehicle body mount so that it does not fall out prior to the body drop step. This function is typically performed by a bolt retainer clip that is positioned in an inner tube of the vehicle body mount. Typical bolt retainer clips have a ring-shaped body with legs that extend longitudinally (axially) from one end. The legs have inwardly bent ends that contact the bolt at a number of circumferentially spaced points. While this structure keeps the bolt from falling out of the vehicle body mount, it allows the bolt to pivot (i.e., tilt/gimbal) relative to the inner tube of the vehicle body mount. This can lead to bolt misalignment problems when the vehicle body is dropped on the frame.

SUMMARY

This section provides a general summary of the disclosure, and is not a comprehensive disclosure of its full scope or all of its features.

In accordance with one aspect of the subject disclosure, an improved bolt retainer clip is provided for positioning a fastener and maintaining its alignment within a vehicle body mount. The bolt retainer clip includes a retainer body. The retainer body has a longitudinal axis, an inside surface, and an outside surface. The inside surface faces the longitudinal axis and defines a bolt receiving aperture in the retainer body. The outside surface has an uninterrupted cylindrical shape and a fixed outer diameter. A plurality of fingers extend into the bolt receiving aperture from the inside surface of the retainer body. Each finger extends from a proximal finger end that is attached to the inside surface of the retainer body to a terminal finger end that is detached and spaced away from the inside surface of the retainer body. Each finger also has a first finger portion with a first curvature and a second finger portion that is either straight or has a second curvature that is different than the first curvature of the first finger portion.

In accordance with another aspect of the subject disclosure, a bolt retainer clip assembly is provided that includes the bolt retainer clip described above and a fastener. The fastener has a fastener head and a shank. Each finger of the bolt retainer clip includes an inner surface and an outer surface. The inner surfaces of the fingers face one another and outer surfaces of the fingers face the inside surface of the retainer body. The shank of the bolt is received within the bolt receiving aperture. The first finger portion of each finger is curved. As a result, a line contact is present between the shank and the inner surface of each finger at a location that is spaced from the terminal finger end. The line contact between the shank and the inner surface of each finger runs parallel to the longitudinal axis and limits gimbaling movements of the fastener relative to the retainer body.

In accordance with yet another aspect of the subject disclosure, a vehicle body mount assembly incorporating the bolt retainer clip assembly described above is provided. The vehicle body mount assembly is configured to connect a vehicle body to a vehicle frame and includes a base member, a tube that extends through the base member, and a resilient member that supports and maintains the position of the tube relative to the base member. The base member has a first support surface that is adapted to contact the vehicle frame. The tube is arranged coaxially with the longitudinal axis and extends between a first tube end and a second tube end. The resilient member is positioned radially between the base member and the tube.

A support member is supported on the first tube end. The support member has a second support surface that is adapted to contact the vehicle body. The fastener described above is received in and extends through at least part of the tube at an orientation where the fastener head is closer to the second tube end than the first tube end. The bolt retainer clip described above is also disposed inside the tube with the outside surface of the retainer body arranged in a friction fit with the tube. The shank of the bolt is received within the bolt receiving aperture in the retainer body such that a contact area extending parallel to the longitudinal axis is present between the shank of the fastener and each finger of the bolt retainer clip. Unlike conventional bolt retainer clips, this design limits gimbaling movements of the shank of the fastener relative to the bolt retainer clip and the tube. By holding the shank in co-axial alignment with the longitudinal axis of the bolt retainer clip and therefore the tube of the vehicle body mount, the bolt retainer clip described herein reduces or eliminates bolt misalignment problems when the vehicle body is dropped on the frame of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
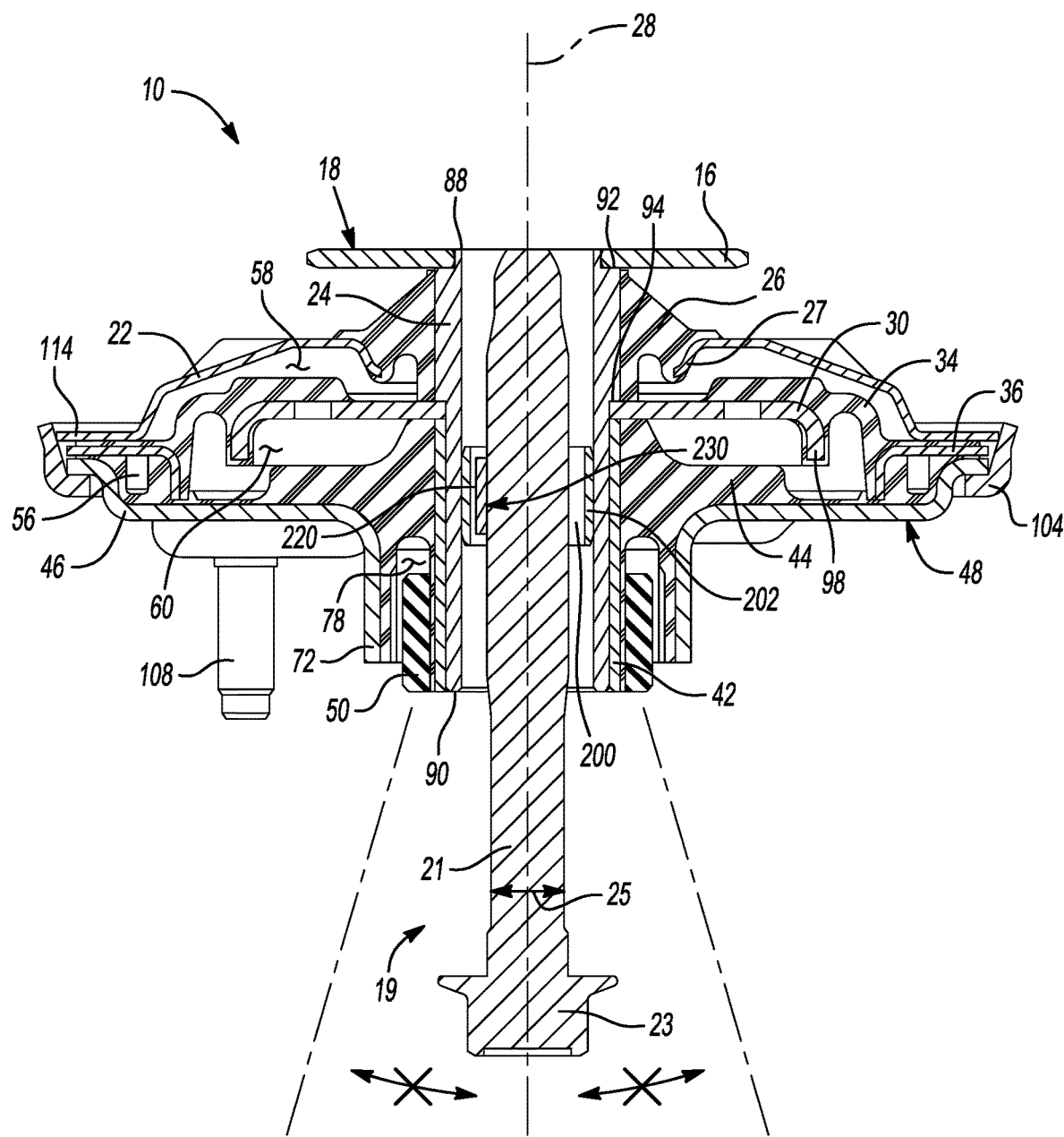
FIG. 1 is a side cross-sectional view of an exemplary vehicle body mount that includes a bolt retainer clip constructed according to the present disclosure.

Example embodiments will now be described more fully with reference to the accompanying drawings.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a vehicle body mount assembly 10 for connecting a vehicle body 12 to a frame 14 of a vehicle 15 is illustrated. The vehicle body mount assembly 10 includes a base member 46, a tube 24 that extends through the base member 46, and one or more resilient members 26, 34, 44 that support and maintain the position of the tube 24 relative to the base member 46. The base member 46 has a first support surface 18 that is adapted to contact the vehicle frame 14 (see FIG. 2). The tube 24 is arranged coaxially with a longitudinal axis 28 and extends between a first tube end 88 and a second tube end 90. Resilient member 44 is positioned radially between the base member 46 and the tube 24.

A support member 16 is supported on the first tube end 88. The support member 16 has a second support surface 18 that is adapted to contact the vehicle body 12 (see FIG. 2). The vehicle body mount assembly 10 also includes a fastener 19 that has a shank 21 and a fastener head 23. The vehicle body mount assembly 10 includes a bolt retainer clip 200 that is disposed inside the tube 24 and holds the fastener in co-axial alignment within the tube 24. The shank 21 of the fastener 19 is received in and extends through at least part the tube 24 and the bolt retainer clip 200 at an orientation where the fastener head 23 is closer to the second tube end 90 than the first tube end 88. The shank 21 of the fastener 19 has a shank diameter 25 that is selected to fit inside (i.e., pass through) both the tube 24 and the bolt retainer clip 200. In the illustrated embodiment, the fastener 19 is a bolt (e.g., a vehicle body bolt) with a threaded shank 21; however, it should be appreciated that the bolt retainer clip 200 described herein can be used with other styles/types of fasteners.

The vehicle body mount assembly 10 also includes a canopy 22 and a connector plate 30. The canopy 22 extends between the base member 46 and the tube 24 and the connector plate 30 is fixed to the tube between the canopy 22 and the second tube end 90. The connector plate 30 and the resilient members 26, 34, 44 cooperate to define first and second chambers 58, 60 inside the area/pocket between the base member 46 and the canopy 22. The first and second chamber 58, 60 are arranged in fluid communication with one another and form a damping system 86. Fluid communication between the first and second chambers 58, 60 provides a damping force that opposes relative movement between the connector plate 30 and the base member 46.

Figure 2:
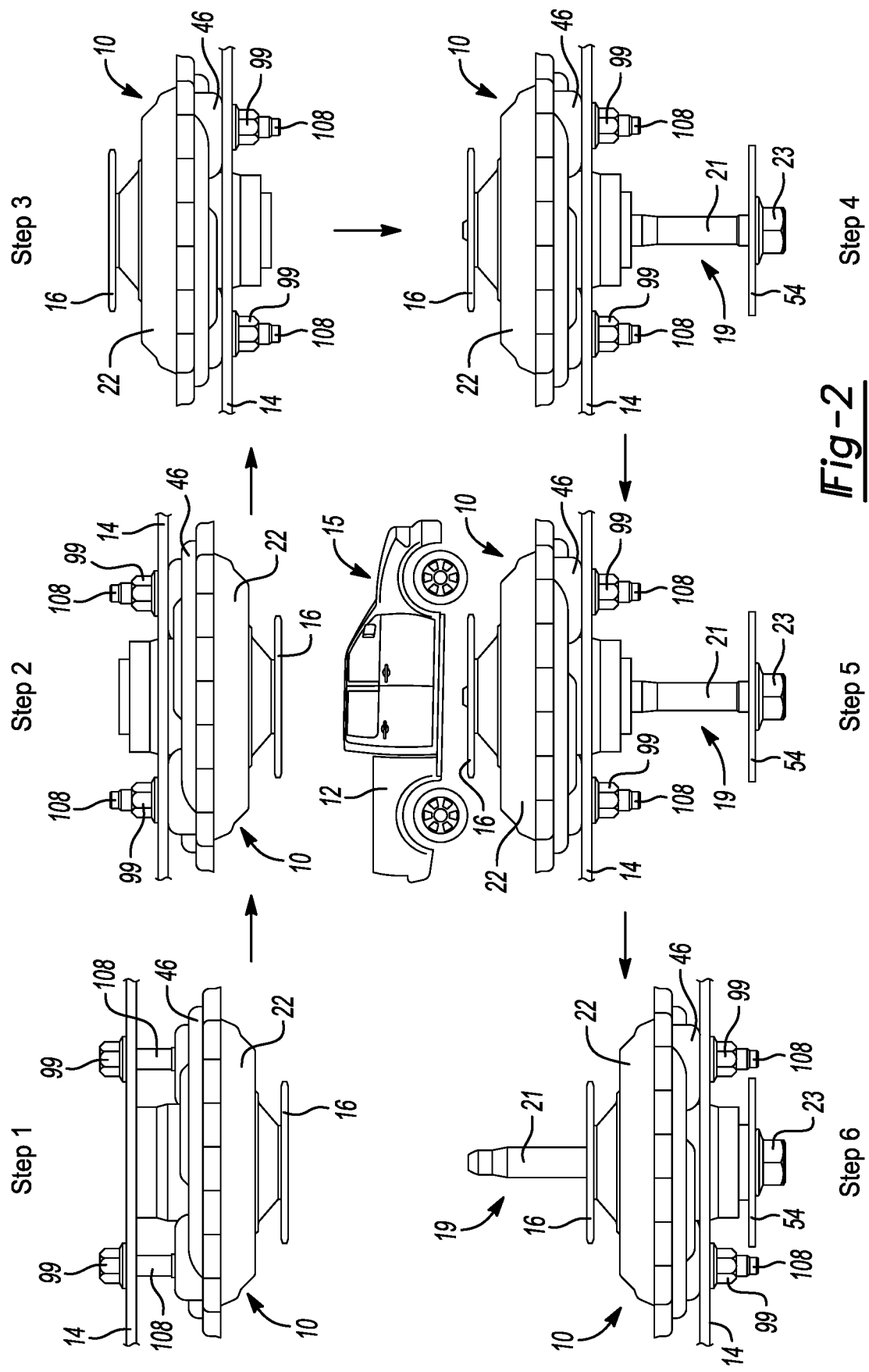
FIG. 2 is a schematic diagram illustrating an exemplary assembly process for using the vehicle body mount shown in FIG. 1 to couple an exemplary vehicle body to a frame.

As shown in FIG. 2, the vehicle body mount 10 can be connected to the vehicle 15 between the vehicle body 12 and the frame 14. In other applications, the vehicle body mount 10 can be placed between other adjoining members in order to provide the vibration damping that will be explained in more detail below.

When the vehicle body mount 10 is installed (see FIG. 2), the support member 16 is brought into contact with the vehicle body 12. The first support surface 18 is the surface of the support member 16, positioned adjacent to the vehicle body 12. The first support surface 18 is a substantially planar surface and, in this example, is an annular surface. In the orientation shown in FIG. 1, the first support surface 18 is disposed at the top of the vehicle body mount 10 and the other elements extend away, or downwardly, from the first support surface 18. The base member 46 is connected to the frame 14. The surface of base member 46 that is located adjacent to the frame 14 is the second support surface 48. The second support surface 48 is disposed on a bottom side of the base member 46 in the orientation of the vehicle body mount 10 shown in FIG. 1. As can be seen, the second support surface 48 is substantially parallel to the first support surface 18. In this configuration, the hydraulic damping system 86 is positioned between the first support surface 18 and the second support surface 48 such that the hydraulic damping system 86 is also positioned between the first support surface 18 and the second support surface 48. In this manner, the vibration damping functionality of the vehicle body mount 10 can be realized when a load is exerted on the vehicle body mount 10 through the vehicle body 12 or the frame 14 through the contact points at the first support surface 18 and the second support surface 48, respectively.

The base member 46 includes a snubber 50 that extends below and away from the second support surface 48. As will be explained in further detail below, this configuration permits elements of the vehicle body mount 10 to be located below the second support surface 48 so that they are not located in the region between the first support surface 18 and the second support surface 48. The amount of packaging space that exists between the vehicle body 12 and the frame 14 can be limited in some applications. By positioning elements of the vehicle body mount 10 outside of the region between the first support surface 18 and the second support surface 48, the amount of necessary space for the vehicle body mount 10 can be advantageously reduced.

Tube 24 runs down the center of the vehicle body mount 10 and is connected to the support member 16 at the first tube end 88. The tube 24 extends downwardly away from the first support surface 18 to the second tube end 90. As shown in FIG. 2, a washer 54 is slid into the shank 21 of the fastener 19 during assembly. The washer 54 is brought into contact with the second tube end 90 when the fastener 19 is tightened. In this arrangement, the tube 24 is the central member to which many of the other elements of the vehicle body mount 10 are connected and arranged. In the illustrated example, the tube 24 is a substantially cylindrical member that is arranged co-axially with the longitudinal axis 28.

The support member 16 is seated on the tube 24 at a first shoulder 92. This permits loads that are exerted on the support member 16 to be efficiently transferred to the tube 24 and, in turn, to the other elements of the vehicle body mount 10. The first resilient member 26 is joined to the tube 24 at a position below the first shoulder 92. The first resilient member 26 radially extends outward from the longitudinal axis 28 and surrounds the tube 24. The first resilient member 26 also extends downward and away from the first support surface 18. As can be seen, this results in a conical shape of the first resilient member 26.

Canopy 22 is connected to the radially outward edge of the first resilient member 26. In one example, the canopy 22 may include an inner flange 27 that is over molded by and fixed to the first resilient member 26. The canopy 22 extends radially outward before turning downward and away from the first support surface 18. An outer lower edge 114 of the canopy 22 is connected to the base member 46. As can be seen, the canopy 22 and the base member 46 encapsulate many of the other elements of the vehicle body mount 10, as will be further described.

Connector plate 30 is received over the tube 24 such that the connector plate 30 is seated on the tube 24 at a second shoulder 94 located axially below the first shoulder 92. The connector plate 30 is a rigid member of the vehicle body mount 10 and extends radially outward from the longitudinal axis 28. The second resilient member 34 is joined to an outer peripheral edge 98 of the connector plate 30. As can be seen, the outer peripheral edge 98 of the connector plate 30 resides radially inward of the location where the canopy 22 turns downward away from the first support surface 18. This profile of the connector plate 30 permits the second resilient member 34 to extend radially outward and downward from the outer peripheral edge 98. The second resilient member 34 is then joined to a channel support 36.

Channel support 36 is also a rigid element of the vehicle body mount 10. The channel support 36 extends radially outward of the second resilient member 34 and is connected and compressed between the canopy 22 and the base member 46. The channel support 36 defines a channel 56 as will be explained in more detail below.

The vehicle body mount 10 also includes a sleeve 42 surrounding the tube 24, where the sleeve 42 is a substantially cylindrical element that is received over the tube 24. The third resilient member 44 is joined to the sleeve 42 and extends radially outward and is further joined to the base member 46.

Certain elements of the vehicle body mount 10 combine to create the hydraulic damping system 86. In particular, the first resilient member 26, canopy 22, channel support 36, second resilient member 34, and the connector plate 30 combine to define the first chamber 58. The connector plate 30, second resilient member 34 and third resilient member 44 combine to define the second chamber 60. A portion of the volume defined by the first chamber 58 and the second chamber 60 is filled with a non-compressible fluid that is permitted to travel between the first chamber 58 and the second chamber 60 to provide damping of vibrations imposed on the vehicle body mount 10 at the first support surface 18 and the second support surface 48.

Fluid is permitted to travel between the first chamber 58 and the second chamber 60. When the pressure in the second chamber 60 is higher than the pressure in the first chamber 58, fluid that is located in the second chamber 60 flows into the first chamber 58. As can be further appreciated, fluid can flow in the reverse direction if the pressure in the first chamber 58 is higher than the pressure in the second chamber 60. The damping characteristics of the vehicle body mount 10 can be varied and tuned by changing various aspects of the hydraulic damping system 86.

The base member 46 includes a flute 72 that is located radially inward of second support surface 48 and that extends downward and away from second support surface 48. The flute 72 extends downward, but does not extend beyond the second tube end 90.

The third resilient member 44 is connected to the sleeve 42 and the flute 72 of base member 46. The third resilient member 44 defines a void 78. The size of the void 78 can be changed to provide other desired vibration damping effects, such as in different direction or to vary the amplitude of such damping effects.

The tube 24 can be sub-assembled as part of the canopy 22. In this example, the canopy 22 includes the first resilient member 26 and the canopy 22 in addition to the tube 24. In the pre-assembled state, the canopy 22 can include one or more fingers or flanges 104 that can be crimped around adjoining members such as the base member 46.

The base member 46 may also include one or more studs 108 that can be welded or otherwise joined to the base member 46 in order to connect the second support surface 48 to the frame 14 (see FIG. 2). The fingers or flanges 104 of the canopy 22 can be crimped over and around the base member 46 with the connector plate 30 positioned in between in order to secure the sub-assemblies in position.

The vehicle body mount 10 may be configured with an elongated profile that is not symmetrical about the longitudinal axis 28. In other embodiments, other profiles may be used. As further shown, the vehicle body mount 10 may include one or more relief features or one or more projections that provide clearance between the vehicle body mount 10 and neighboring components. The one or more relief features or projections may also be included on various components of the vehicle body mount 10 to provide clearance between adjacent parts. As can be appreciated, as the vehicle body mount 10 is subjected to loading and vibration, the various components may move relative to one another due to elastic deformation that may occur. A bolt retainer clip is disposed inside the tube 24 and holds the fastener in co-axial alignment within the tube 24.

The vehicle body mount 10 includes components described as elastomeric and as rigid. For the purposes of this disclosure, these terms are used in a relative basis and generally mean that the rigid components do not undergo significant elastic deformation in normal use while the elastomeric components are intended to undergo elastic deformation during normal use. In the example shown, the rigid components can be stamped or otherwise formed of high strength steel, such as SAE J2340 grade steel. The elastomeric components can be made of suitable natural or artificial rubber, such as a natural rubber with a durometer between 50 and 60. Other suitable materials can be used. Elastomeric components may be fixed or joined to rigid components using any number of methods including adhesive bonding, overmolding, mechanical fastening, and the like.

It should be appreciated that bolt retainer clip 200 may be utilized with the exemplary vehicle body mount 10 previously described or any number of other mounting devices including an elongated bore through which a fastener, such as fastener 19, extends. The detailed description of the various components of the vehicle body mount 10 shown in FIG. 1 are provided as merely one configuration of components. Other mounting devices, not depicted, need not include hydraulic chambers or function to provide damping between interconnected components. Bolt retainer clip 200 is useful for maintaining alignment of a fastener within a first component that is to be subsequently coupled to a second component. Bolt retainer clip 200 assures ease of fastener installation within the mounting device bore. Proper fastener retention and alignment are provided regardless of the configuration of the component through which the fastener extends.

With additional reference to FIG. 2, an exemplary assembly line process for mounting the vehicle body 12 on the frame 14 is illustrated. The process begins on the upper left-side of FIG. 2 at step 1 and ends on the lower left-side of FIG. 2 at step 6. In step 1, the vehicle body mount assembly 10 is installed on the vehicle frame 14 with the vehicle frame 14 in an upside-down orientation. As part of step 1, nuts 99 are loosely tightened on the studs 108. The bolt retainer clip 200 comes pre-installed inside the tube 24 of the vehicle body mount assembly 10. In step 2, the nuts 99 are fully tightened on the studs 108. Then, in step 3, the frame 14 is flipped over to its final and correct orientation. At step 4, the shank 21 of the fastener 19 is pushed into the tube 24 of the vehicle body mount assembly 10 and the bolt retainer clip 200. The bolt retainer clip 200 holds the shank 21 of the fastener 19 in proper co-axial alignment within the tube 24 of the vehicle body mount assembly 10 until the vehicle body 12 is dropped onto the vehicle frame 14 at step 5. Then at step 6, the fastener 19 is threaded into a threaded receptacle/bore in the vehicle body 12 to secure (i.e., marry) the vehicle body 12 to the vehicle frame 14. The bolt retainer clip 200 prevents the fastener 19 from dropping away from the vehicle body mount assembly 10 and from tilting (i.e., gimballing) within the tube 24 of the vehicle body mount assembly 10 and therefore reduces or eliminates fastener misalignment problems when the vehicle body 12 is dropped onto the vehicle frame 14.

Figure 3:
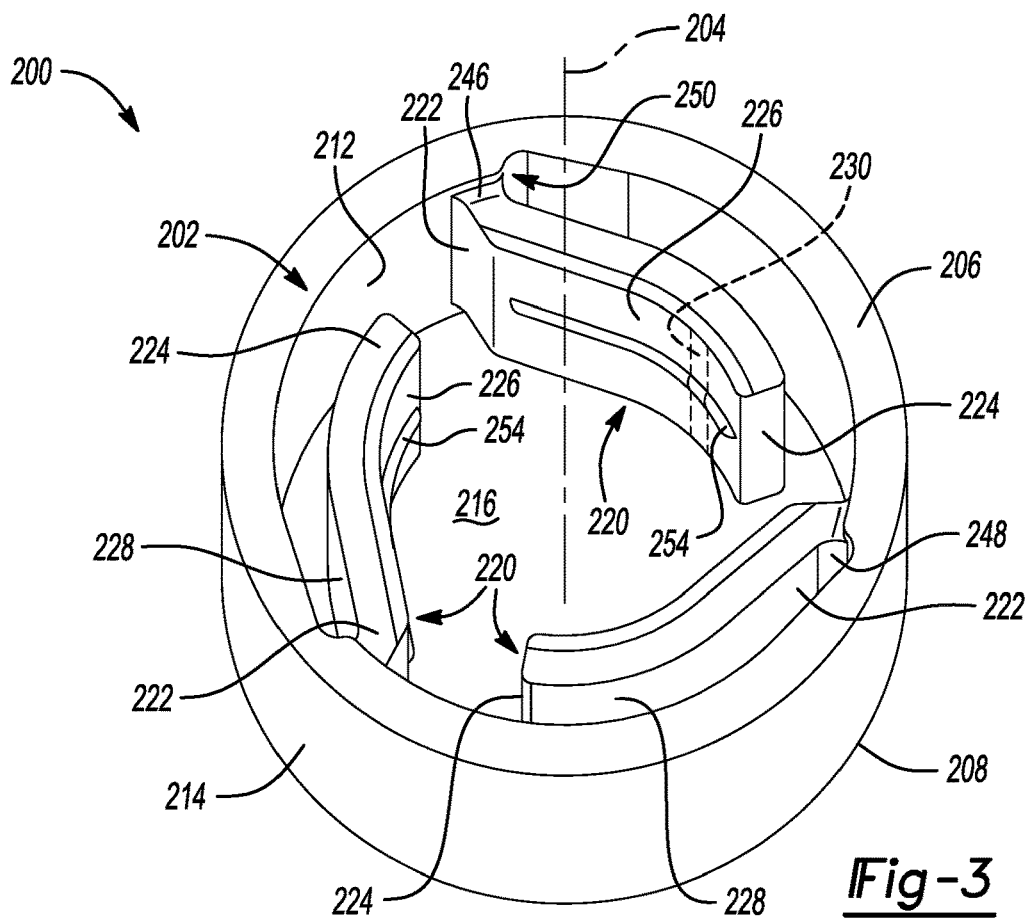
FIG. 3 is a top perspective view of an exemplary bolt retainer clip constructed according to the present disclosure.
Figure 4:
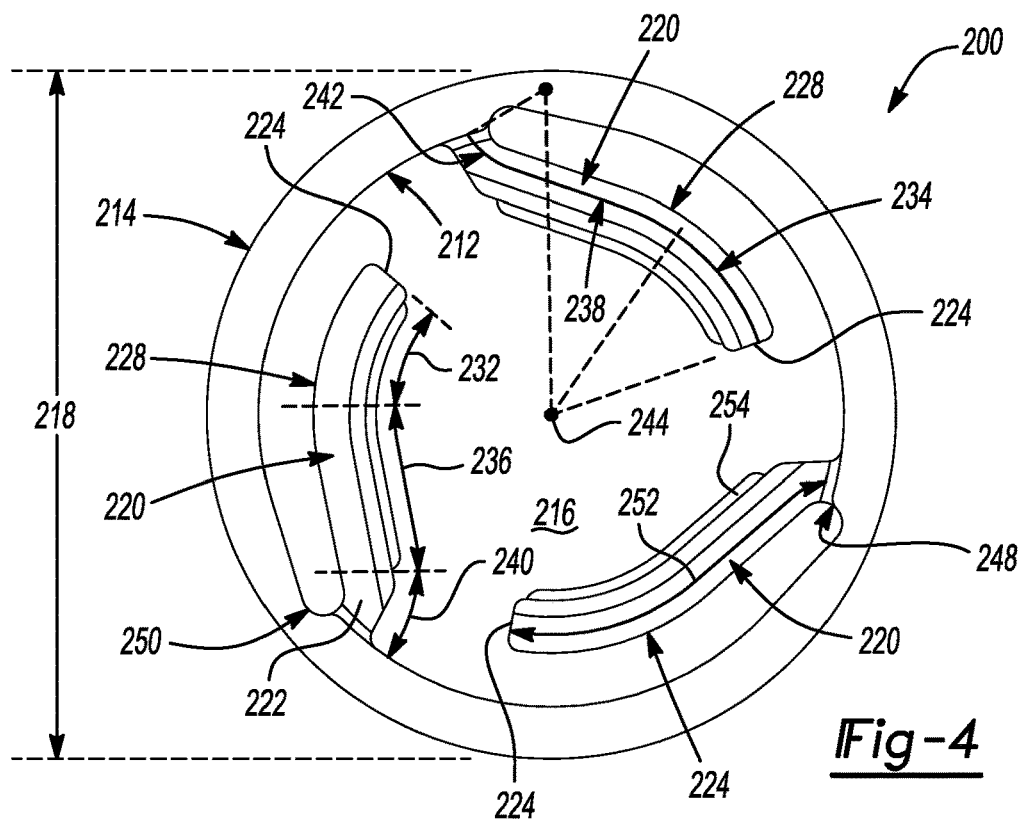
FIG. 4 is a top plan view of the bolt retainer clip shown in FIG. 3.
Figure 5:
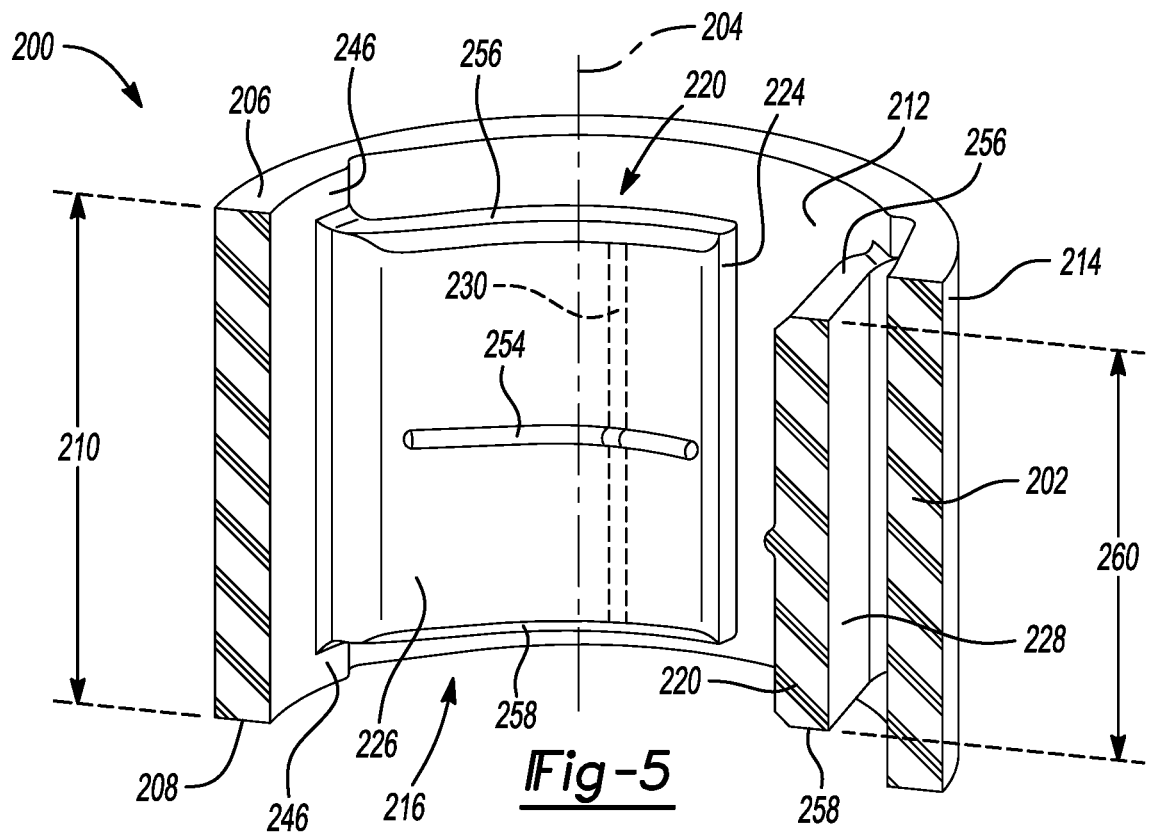
FIG. 5 is a perspective section view of the bolt retainer clip shown in FIG. 3.

With reference to FIGS. 3-5, the bolt retainer clip 200 includes a retainer body 202 that extends annularly about a longitudinal axis 204 and axially between a first longitudinal end 206 and a second longitudinal end 208. Thus, it should be appreciated that the retainer body 202 has a body height 210 that is measured between the first and second longitudinal ends 206, 208 in a direction that runs parallel to the longitudinal axis 204.

The retainer body 202 includes an inside surface 212 and an outside surface 214. The inside surface 212 of the retainer body 202 faces in towards the longitudinal axis 204 and defines a bolt receiving aperture 216. The outside surface 214 of the retainer body 202 has an uninterrupted cylindrical shape and is arranged in a friction fit with the tube 24. The retainer body 202 is a continuous and uninterrupted cylinder. As a result, the outside surface 214 of the retainer body 202 has a fixed outer diameter 218. This means that the retainer body 202 does not include any gaps, splits, cuts, bends, or depressions that would allow the retainer body 202 to change diameter. In other words, the retainer body 202 is not configured to radially expand or contract to any appreciable degree.

A plurality of fingers 220 extend into the bolt receiving aperture 216 from the inside surface 212 of the retainer body 202. Although the number of fingers 220 may vary from that shown in the illustrated embodiments, the bolt retainer clip 200 includes three fingers 220. Each finger 220 extends from a proximal finger end 222 that is attached to the inside surface 212 of the retainer body 202 to a terminal finger end 224 that is detached and spaced away from the inside surface 212 of the retainer body 202. In other words, the terminal finger end 224 of each finger 220 is a free and untethered end. Each finger 220 also includes an inner surface 226 that is adapted to contact the shank 21 of the fastener 19 and an outer surface 228 that faces the inside surface 212 of the retainer body 202. The inner surface 226 is therefore opposite of outer surface 228 on each finger 220.

As shown in FIGS. 1 and 2, the shank 21 of the fastener 19 is received within the bolt receiving aperture 216 such that a contact area 230 is present between the shank 21 of the fastener 19 and the inner surface 226 of each finger 220 of the bolt retainer clip 200. Unlike traditional bolt retainer clip 200 designs, the contact area 230 between the shank and the fingers 220 is along the inner surface 226 of each finger 220 at a location that is spaced from the terminal finger end 224. Each contact area 230 extends parallel to the longitudinal axis 204 to limit gimbaling movements of the shank 21 of the fastener 19 relative to the bolt retainer clip 200 and the tube 24. The fingers 220 extend in a tangential orientation in the annular space between the inside surface 212 of the retainer body 202 and the shank 21 and therefore hold the shank 21 in co-axial alignment with the longitudinal axis 204 of the retainer body 202. The fingers 220 are positioned entirely within the bolt receiving aperture 216 and therefore do not extend out beyond the first and second longitudinal ends 206, 208 of the retainer body 202.

The fingers 220 of the bolt retainer clip 200 are curved. In the example shown in FIGS. 3-5, each finger 220 has a first finger portion 232 with a first curvature 234, a second finger portion 236 that has a second curvature 238, and a third finger portion 240 that has a third curvature 242. The second curvature 238 of the second finger portion 236 is different from the first curvature 234 of the first finger portion 232. The first finger portion 232 of each finger 220 is positioned between the second finger portion 236 and the terminal finger end 224 and the third finger portion 240 is positioned between the second finger portion 236 and the proximal finger end 222. Thus, the second finger portion 236 is positioned between the first finger portion 232 and the third finger portion 240. The first finger portion 232 follows a concave curve/arc, which has a center point 244 positioned along the longitudinal axis 204 of the retainer body 202. The third finger portion 240 follows a convex curve/arc and is reversed relative to the first curvature 234 of the first finger portion 232. That is to say that the first and third finger portions 232, 240 are curved in opposite directions. The second finger portion 236 has only a shallow/slight curve or alternatively may be straight (i.e., the second curvature 238 may equal zero).

The fingers 220 of the bolt retainer clip 200 are resilient such that friction between the contact area 230 of each finger 220 and the shank 21 retains the shank 21 of the fastener 19 in the tube 24. This allows the fastener 19 to be positioned in the tube 24 well before the assembly line step where the vehicle body 12 is mounted/fastened to the frame 14. Although other configurations may be possible, in the illustrated examples, the fingers 220 are integral with the retainer body 202 and both the retainer body 202 and the fingers 220 are made of a polymeric material, such as polyethylene, polypropylene, nylon, or glass reinforced nylon.

Still referring to FIGS. 3-5, each finger 220 includes a living hinge 248 at the proximal finger end 222. Each living hinge 248 includes a relief area 250 in the form of a depression on the inside surface 212 of the retainer body 202. The relief area 250 reduces the stress concentration at the proximal finger end 222 and also increases an overall length 252 of each finger 220, which reduces the overall stiffness of the fingers 220 for any given combination of finger 220 material, height, and thickness. The relief area 250 also enables greater finger 220 deflection so the fastener does not bind within the bolt receiving aperture 216 of the bolt retainer clip 200.

Optionally, each finger 220 may include a rib 254 that protrudes inwardly from the inner surface 226 of the finger 220. Each rib 254 runs substantially perpendicular to the longitudinal axis 204 of the retainer body 202 and is configured to match the thread pitch of the fastener 19. The ribs 254 increase the push-in force required to insert the shank 21 of the fastener 19 into the bolt receiving aperture 216 in the retainer body 202 and also increases the retention force between the bolt retainer clip 200 and the fastener 19.

With reference to FIG. 5, each finger 220 has a first end face 256, a second end face 258, and a finger height 260. The finger height 260 is measured between the first and second end faces 256, 258 in a direction that is parallel to the longitudinal axis 204. In the exemplary embodiment shown in FIGS. 3-5, the first and second end faces 256, 258 of each finger 220 are inset relative to the first and second longitudinal ends 206, 208 of the retainer such that a step 246 is formed between first end face 256 of each finger 220 and the first longitudinal end 206 of the retainer body 202 and between the second end face 258 of each finger 220 and the second longitudinal end 208 of the retainer body 202. In accordance with this embodiment, the finger height 260 of each finger 220 is less than the body height 210 of the retainer body 202. This reduces the stiffness of the fingers 220. As such, it should be appreciated that the stiffness of the fingers 220 can be fine-tuned for a specific application simply by increasing or decreasing the finger height 260 without changing the overall packaging size of the bolt retainer clip 200 (i.e., without changing the body height 210 and fixed outer diameter 218 of the retainer body 202).

Figure 6:
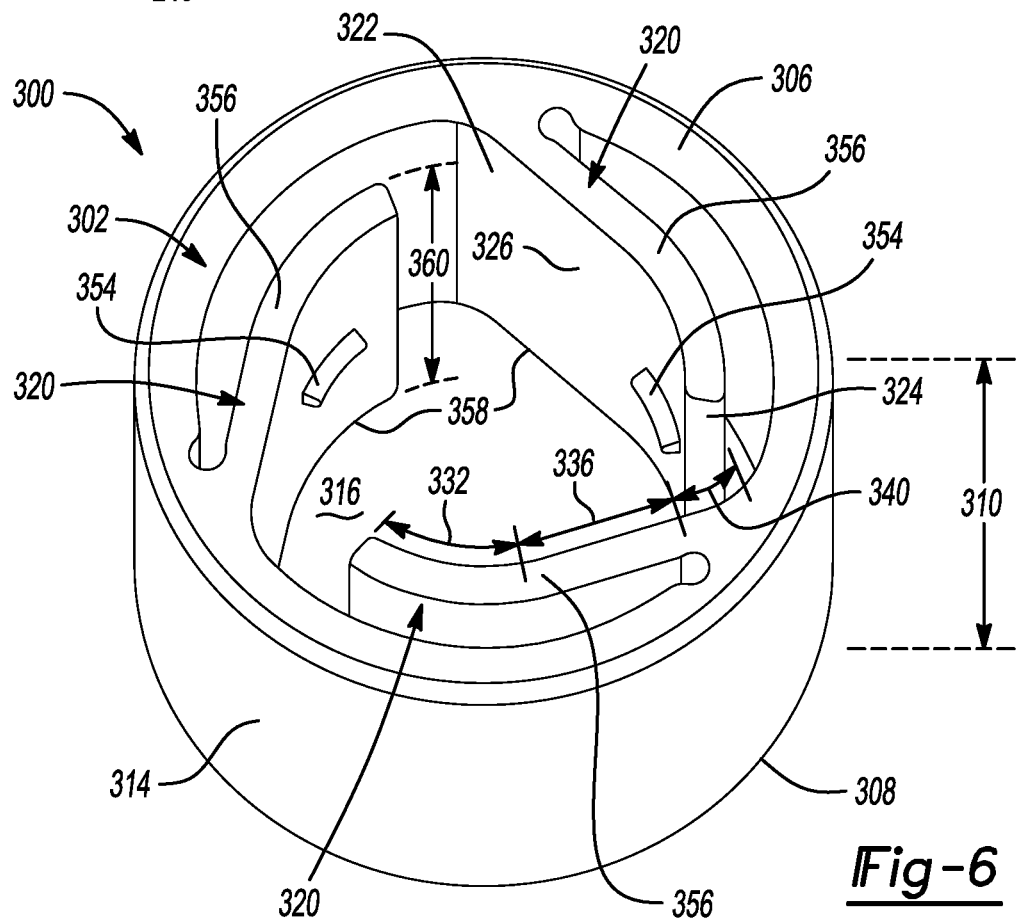
FIG. 6 is a top perspective view of another exemplary bolt retainer clip constructed according to the present disclosure.

With reference to FIG. 6, another bolt retainer clip 300 is illustrated. Many of the elements of the bolt retainer clip 200 shown in FIGS. 3-5 are the same or substantially the same as the elements of the bolt retainer clip 300 shown in FIG. 6, except as noted below. Equivalent elements shared between the embodiments have corresponding reference numbers where 200's have been used to identify the elements of the bolt retainer clip 200 shown in FIGS. 3-5 and 300's have been used to identify the elements of the bolt retainer clip 300 shown in FIG. 6. For example, reference number 202 has been used to identify the retainer body in FIGS. 3-5, while reference number 302 has been used to identify the retainer body in FIG. 6. Accordingly, the above description of common elements applies equally to this embodiment and will not be repeated below.

The bolt retainer clip 300 shown in FIG. 6 differs in that each finger 320 includes a first finger portion 332 that is curved, a second finger portion 336 that is straight, and a third finger portion 340 that is straight. In addition, the finger height 360 of each finger 320 equals the body height 310 of the retainer body 302 in this example. As a result of these changes, the fingers 320 of the bolt retainer clip 300 illustrated in FIG. 6 would have a greater stiffness and retention force compared to the fingers 220 of the bolt retainer clip 200 illustrated in FIGS. 3-5.

Figure 7:
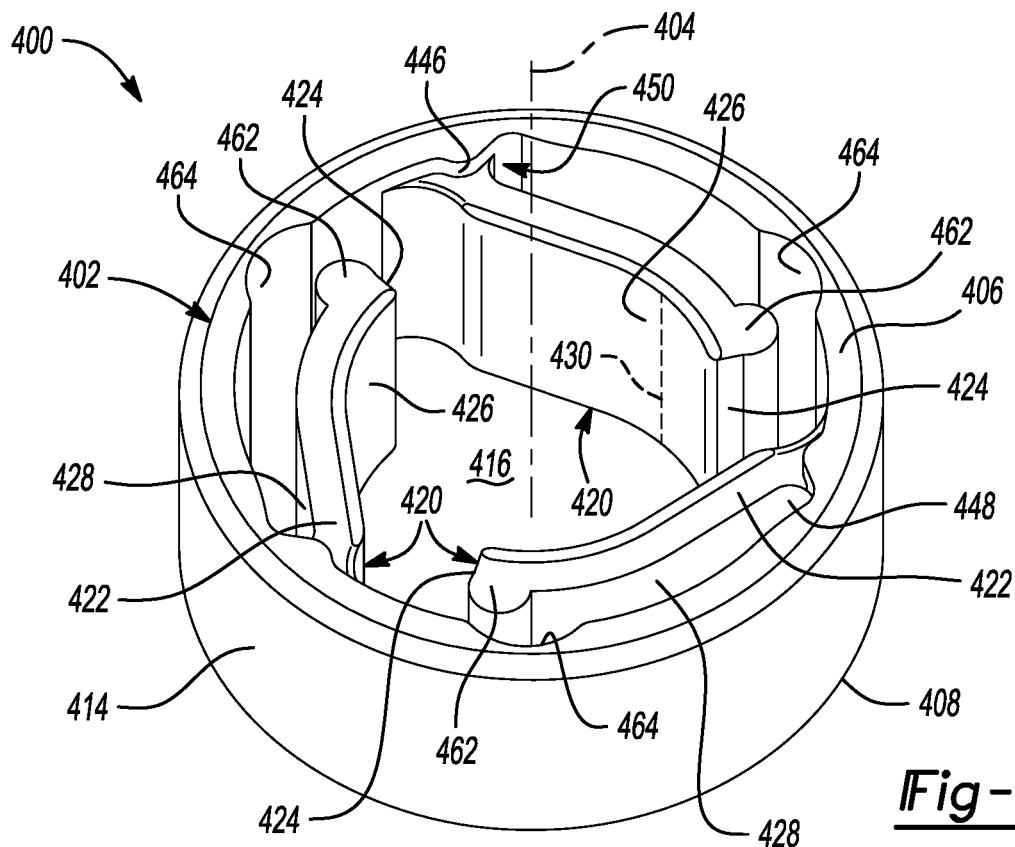
FIG. 7 is a top perspective view of another exemplary bolt retainer clip constructed according to the present disclosure.
Figure 8:
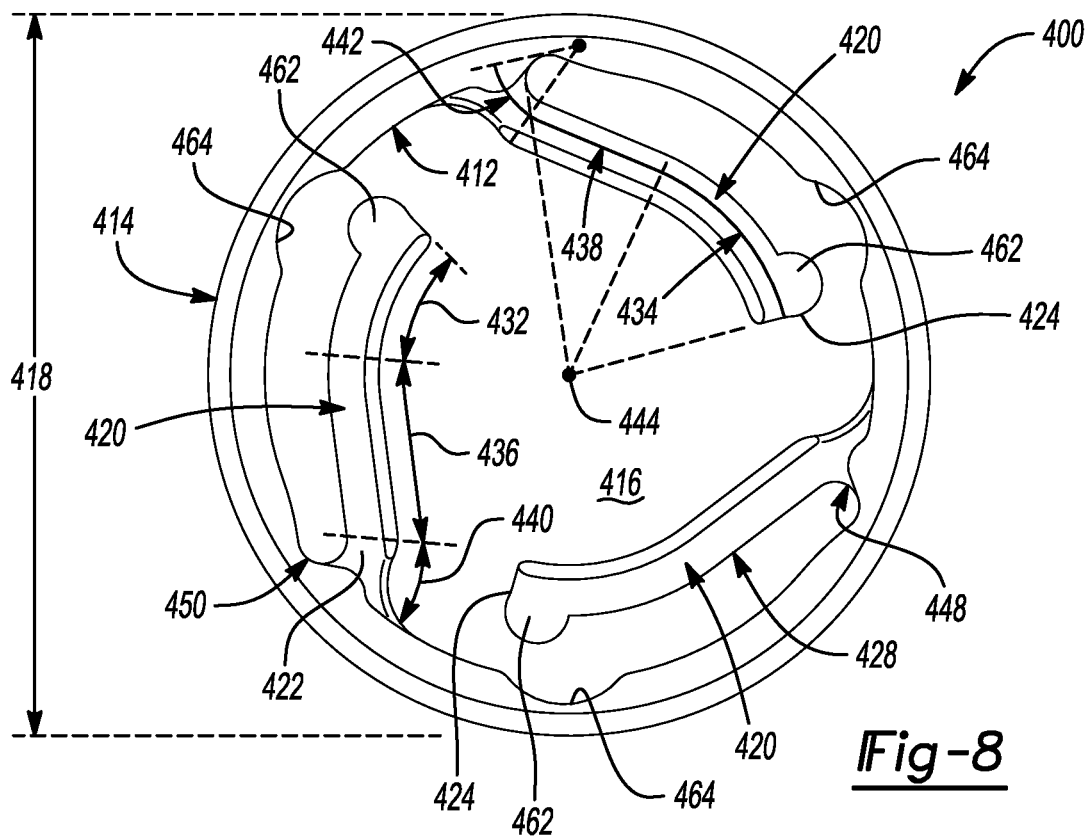
FIG. 8 is a top plan view of the bolt retainer clip shown in FIG. 7.
Figure 9:
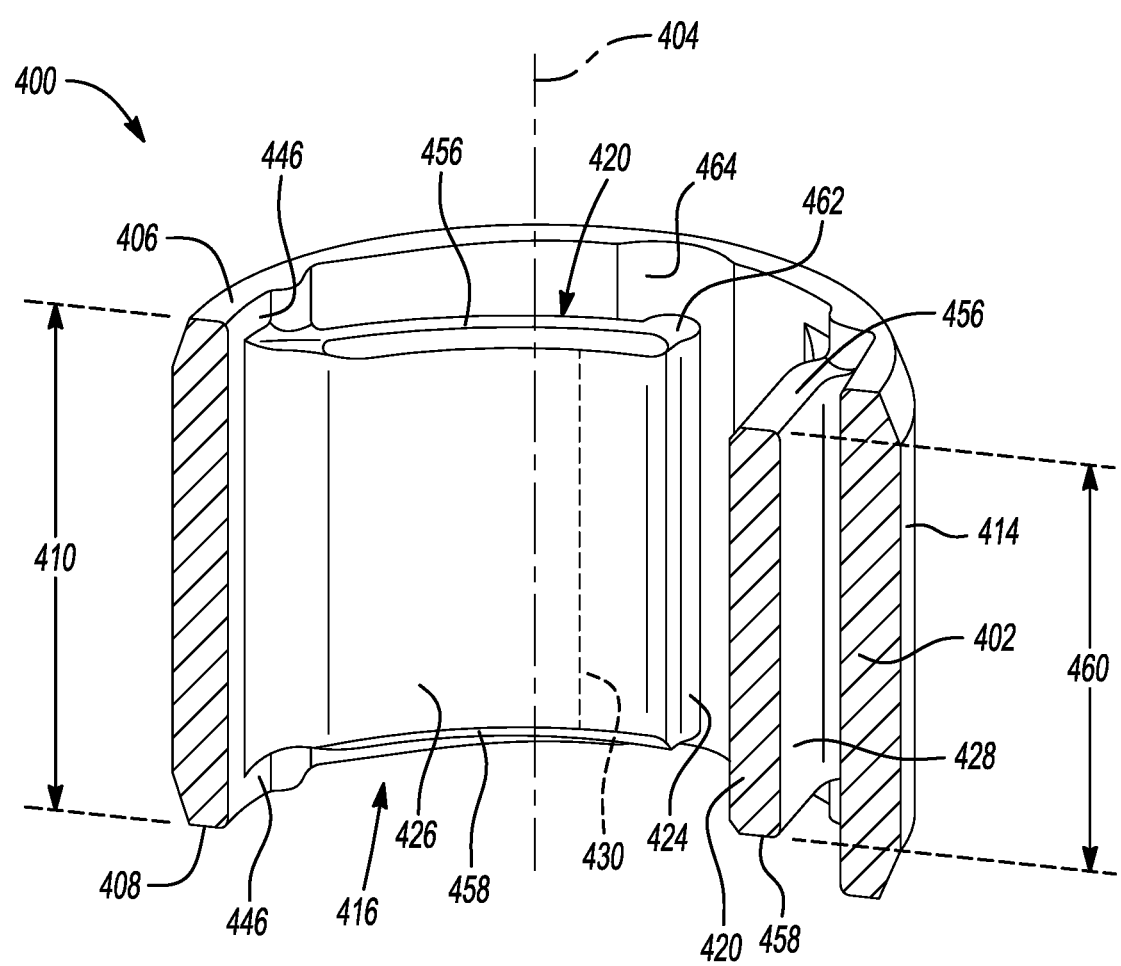
FIG. 9 is a perspective section view of the bolt retainer clip shown in FIG. 7.

With reference to FIGS. 7-9, another bolt retainer clip 400 is illustrated. Many of the elements of the bolt retainer clip 200 shown in FIGS. 3-5 are the same or substantially the same as the elements of the bolt retainer clip 400 shown in FIGS. 7-9, except as noted below. Equivalent elements shared between the embodiments have corresponding reference numbers where 200's have been used to identify the elements of the bolt retainer clip 200 shown in FIGS. 3-5 and 400's have been used to identify the elements of the bolt retainer clip 400 shown in FIGS. 7-9. For example, reference number 202 has been used to identify the retainer body in FIGS. 3-5, while reference number 402 has been used to identify the retainer body in FIGS. 7-9. Accordingly, the above description of common elements applies equally to this embodiment and will not be repeated below.

The bolt retainer clip 400 shown in FIGS. 7-9 differs in that each finger 420 includes a curved boss 462 at the terminal finger end 424 that extends radially outwardly from the outer surface 428 of the finger 420. In accordance with the designs shown herein, the bolt retainer clip 400 may be injection molded. The curved bosses 462 increase the thickness of each finger 420 at the terminal finger end 424 and provide a surface that injector pins can push against to remove the bolt retainer clip 400 from a plastic injection mold. In accordance with this design, the retainer body 402 further includes clearance areas 464, in the form of depressions on the inside surface 412 of the retainer body 402, that are aligned with the curved bosses 462. The clearance areas 464 are therefore configured to receive the curved bosses 462 of the fingers 420 when the fingers 420 flex outwardly towards the retainer body 402 in response to insertion of the shank 21 of the fastener 19.

In the embodiment shown in FIGS. 7-9, the first curvature 434 of the first finger portion 432 is selected to follow a smaller curve/arc than the shank diameter 25 of the fastener 19. In accordance with this specific geometry, a line contact 430 between the shank 21 of the fastener 19 and the inner surface 426 of each finger 420 is created that is spaced from the terminal finger end 424 and runs parallel to the longitudinal axis 404 of the retainer body 402. This arrangement has been found to promote the outward deflection of the fingers 420 when the shank 21 of the fastener 19 is inserted into the bolt receiving aperture 416 in the bolt retainer clip 400. However, it should be appreciated that the curve/arc of the first finger portion 432 could alternatively be selected such that the first curvature 434 will equal the shank diameter 25, or be greater than the shank diameter 25.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bolt retainer clip for positioning a fastener, comprising:
    a retainer body having a longitudinal axis, an inside surface facing the longitudinal axis and defining a bolt receiving aperture, and an outside surface having an uninterrupted cylindrical shape and a fixed outer diameter;
    a plurality of fingers extending into the bolt receiving aperture from the inside surface of the retainer body;
    each of the fingers extending from a proximal finger end that is attached to the inside surface of the retainer body to a terminal finger end that is detached and spaced away from the inside surface of the retainer body; and
    each of the fingers having a first finger portion with a first curvature and a second finger portion that is straight or has a second curvature that is different than the first curvature of the first finger portion,
    wherein the first finger portion is positioned between the second finger portion and the terminal finger end and wherein the second finger portion is positioned between the first finger portion and the proximal finger end.

2. The bolt retainer clip as set forth in claim 1, wherein the first finger portion follows a concave curve with a center point positioned along the longitudinal axis of the retainer body.

3. The bolt retainer clip as set forth in claim 2, wherein each of the fingers has a third finger portion that is positioned between the second finger portion and the proximal finger end, the third finger portion having a third curvature that is convex and reversed relative to the first curvature of the first finger portion.

4. A bolt retainer clip for positioning a fastener, comprising:
    a retainer body having a longitudinal axis, an inside surface facing the longitudinal axis and defining a bolt receiving aperture, and an outside surface having an uninterrupted cylindrical shape and a fixed outer diameter;
    a plurality of fingers extending into the bolt receiving aperture from the inside surface of the retainer body;
    each of the fingers extending from a proximal finger end that is attached to the inside surface of the retainer body to a terminal finger end that is detached and spaced away from the inside surface of the retainer body; and
    each of the fingers having a first finger portion with a first curvature and a second finger portion that is straight or has a second curvature that is different than the first curvature of the first finger portion;
    wherein each finger includes an inner surface that is adapted to contact a shank of the fastener and an outer surface that faces the inside surface of the retainer body,
    wherein each finger includes a curved boss at the terminal finger end that extends radially outwardly from the outer surface of the finger and wherein the retainer body includes clearance areas, in the form of depressions on the inside surface of the retainer body, that are aligned with and are configured to receive the curved boss on each of the fingers when the fingers flex outwardly towards the retainer body in response to contact with the shank of the fastener.

5. The bolt retainer clip as set forth in claim 4, wherein each finger includes a rib that protrudes inwardly from the inner surface of the finger and that runs substantially perpendicular to the longitudinal axis of the retainer body.

6. A bolt retainer clip for positioning a fastener, comprising:
    a retainer body having a longitudinal axis, an inside surface facing the longitudinal axis and defining a bolt receiving aperture, and an outside surface having an uninterrupted cylindrical shape and a fixed outer diameter;
    a plurality of fingers extending into the bolt receiving aperture from the inside surface of the retainer body;
    each of the fingers extending from a proximal finger end that is attached to the inside surface of the retainer body to a terminal finger end that is detached and spaced away from the inside surface of the retainer body; and
    each of the fingers having a first finger portion with a first curvature and a second finger portion that is straight or has a second curvature that is different than the first curvature of the first finger portion,
    wherein the retainer body has a first longitudinal end, a second longitudinal end, and a body height that is measured between the first and second longitudinal ends in a direction that runs parallel to the longitudinal axis and wherein the plurality of fingers do not extend beyond the first and second longitudinal ends of the retainer body, wherein each finger has a finger height that is measured parallel to the longitudinal axis and wherein the finger height of each finger equals the body height.

7. The bolt retainer clip as set forth in claim 1, wherein each finger has a finger height that is measured parallel to the longitudinal axis and wherein the finger height of each finger equals a body height.

8. The bolt retainer clip as set forth in claim 1, wherein each finger includes a living hinge at the proximal finger end and wherein each living hinge includes a relief area in the form of a depression on the inside surface of the retainer body.

9. The bolt retainer clip as set forth in claim 1, wherein each finger is integral with the retainer body and is resilient.

10. The bolt retainer clip as set forth in claim 1, wherein the retainer body and the fingers are made of a polymeric material.

\* \* \* \* \*